United States Patent [19]

Wash et al.

[11] Patent Number: 4,947,196
[45] Date of Patent: Aug. 7, 1990

[54] CAMERA APPARATUS FOR MAGNETICALLY RECORDING ON FILM

[75] Inventors: Michael L. Wash, Pittsford; Conrad Diehl, Rochester, both of N.Y.

[73] Assignee: Eastman Kodak Company, Rochester, N.Y.

[21] Appl. No.: 423,578

[22] Filed: Oct. 11, 1989

Related U.S. Application Data

[63] Continuation of Ser. No. 254,906, Oct. 7, 1988, abandoned.

[51] Int. Cl.⁵ .............................................. G03B 17/24
[52] U.S. Cl. ........................................ 354/76; 354/106
[58] Field of Search ...................... 354/21, 75, 76, 105, 354/106

[56] References Cited

U.S. PATENT DOCUMENTS

| | | | |
|---|---|---|---|
| 4,270,853 | 6/1981 | Hatada et al. | 354/76 |
| 4,270,854 | 6/1981 | Stemme et al. | 354/76 |
| 4,500,183 | 2/1985 | Tanikawa | 354/21 |
| 4,613,911 | 9/1986 | Ohta | 360/3 |
| 4,642,717 | 2/1987 | Matsuda et al. | 360/105 |
| 4,689,696 | 8/1987 | Plummer | 358/333 |
| 4,736,215 | 4/1988 | Hudspeth et al. | 354/21 |
| 4,843,414 | 6/1989 | Yoshina | 354/21 |

Primary Examiner—Michael L. Gellner
Attorney, Agent, or Firm—James A. Smith

[57] ABSTRACT

Magnetic recording apparatus for a photographic still camera comprises a magnetic head mounted on a flexure attached to a film platen. The head is adapted to contact a magnetic coating on the film adjacent the lip opening of a film cartridge where the film has residual stiffness. The flexure permits the head to move about three axis to permit vertical, pitch and roll displacements of the head which compensate for transient disturbances on the film.

7 Claims, 5 Drawing Sheets

CAMERA APPARATUS FOR MAGNETICALLY RECORDING ON FILM

This is a continuation of application Ser. No. 254,906 filed Oct. 7, 1988, now abandoned.

CROSS REFERENCE TO RELATED APPLICATIONS

Reference is made to the following commonly assigned copending applications:

1. U.S. Ser. No. 254,903, entitled CAMERA APPARATUS FOR MAGNETICALLY RECORDING ON FILM, and filed Oct. 7, 1988 in the names of Michael L. Wash and Christopher T. Mattson.

2. U.S. Ser. No. 254,908, entitled CAMERA APPARATUS FOR MAGNETICALLY RECORDING ON FILM, and filed Oct. 7, 1988 in the names of Daniel M. Pagano and Robert P. Cloutier.

3. U.S. Ser. No. 254,914, entitled CAMERA APPARATUS FOR MAGNETICALLY RECORDING ON FILM, and filed Oct. 7, 1988 in the name of Richard R. Kelbe.

4. U.S. Ser. No. 255,693, entitled FILM INFORMATION EXCHANGE SYSTEM USING DEDICATED MAGNETIC TRACKS ON FILM and filed Oct. 7, 1988 in the name of Robert P. Cloutier et al.

5. U.S. Ser. No. 221,955, entitled MOTOR-DRIVEN FILM TRANSPORT APPARATUS, and filed July 20, 1988 in the name of Donald M. Harvey. U.S. Ser. No. 221,955 is incorporated into this application by reference.

6. U.S. Ser. No. 206,407, entitled, as amended, THREE PART DECODER CIRCUIT, and filed June 14, 1988 in the name of Michael L. Wash.

7. U.S. Ser. No. 206,408, entitled, as amended, THREE PART ENCODER CIRCUIT, and filed June 14, 1988 in the names of Arthur Whitfield and Michael L. Wash.

8. U.S. Ser. No. 206,553, entitled, as amended, THREE PART DECODER CIRCUIT, and filed June 14, 1988 in the name of Arthur Whitfield.

9. U.S. Ser. No. 206,646, entitled METHOD FOR MODULATING A BINARY DATA STREAM, and filed June 14, 1988 in the name of Michael L. Wash.

10. U.S. Ser. No. 254,907, entitled CAMERA APPARATUS FOR PREVENTING DOUBLE EXPOSURE and filed Oct. 7, 1988 in the name of James W. Cannon.

BACKGROUND OF THE INVENTION

This invention relates to magnetic recording apparatus for cameras and more particularly, to magnetic recording apparatus for photographic still cameras.

In commonly assigned copending application Ser. No. 255,693 entitled FILM INFORMATION EXCHANGE SYSTEM USING DEDICATED MAGNETIC TRACKS ON FILM, and filed Oct. 7, 1988 in the name of Robert P. Cloutier there is disclosed a photographic film having a virtually transparent magnetic coating covering the non-emulsion side of the film and dedicated recording areas on the coating for recording information such as film type, film speed, film exposure information and information relevant to the processing and subsequent use (e.g. printing) of the film. The system thus provides for reading and/or recording of information during film manufacture, recording of information during camera use, and reading and/or recording of printing related information during photofinishing. In the aforementioned copending application it is specifically proposed that camera information be recorded in spaced tracks preferably outside the image area along the edge of the film.

Reading and writing information on a magnetic coating or stripe on photographic film in a still camera requires solutions to problems different than those encountered in other apparatus. Perhaps the most significant problem is the space limitations in a portable hand held still camera which necessarily must be as compact and light as possible to appeal to the average consumer. Perhaps equally significant, however, is the characteristics of photographic film relative to more common recording mediums such as magnetic tape. Because photographic films are stiffer then magnetic tape and have varying degrees of curl both in the longitudinal and tranverse directions depending upon the base materials and number and nature of sensitizing layers and environmental conditions, they present unusual problems in reading and writing information on a magnetic coating or stripe. To provide a reliable read or write signal the magnetic head must remain in close proximity to the magnetic coating. Any disturbances such as variations in film curl can vary the relationship of the head to the coating and decrease the reliability of the signal.

Another problem unique to compact photographic still cameras is that film advance occurs in a short period of time with a limited amount of motion and does not allow the steady state conditions normally associated with magnetic recording. Recording and playback must take place during transient conditions which tend to separate the film from the recording head. For optimum magnetic recording during these conditions, the magnetic head must maintain contact (i.e. within 10 micro-inches) with the magnetic coating.

Techniques for maintaining the desired relationship of the head to a magnetic coating in other apparatus, are not practical for use in a photographic still camera particularly a compact 35 mm camera. For example, in a sound movie camera, a film having a magnetic stripe along one edge is typically moved over a drum and information is recorded by a magnetic head positioned in close proximity to the drum. The drum provides a rigid support for the film, removes film curl and assures a uniform head to film relationship. While such a fixed support such as a sound drum produces satisfactory results, the space limitations in a photographic still camera render it impractical. Also, it is not suitable for the transient conditions described above.

Also, in a still camera system, it is desirable to record information pertinent to and coincident with images because negatives are cut up in photofinishing. In sound movie cameras, recorded information is displaced from the image to achieve continuous motion of the film during recording as compared with intermittent motion during exposure.

The prior art relating to recording on photographic films thus generally teaches providing a support for the recording medium on the side opposite from the recording head to ensure reliable recording.

In commonly assigned copending application Ser. No. 254,903, filed Oct. 7, 1988 in the names of Michael L. Wash and Christopher T. Mattson, a support on the other side of the film is provided by providing a recess in the cartridge film exit lip and positioning a magnetic head to engage a magnetic coating or stripe on the film within the recess so that the felt light-locking material and the lower side of the lip cooperate to provide a compliant support on the side of the film opposite to the recording head. While this structure provides a support of the type considered necessary in the prior art and is suitable for compact cameras it requires a special film cartridge.

SUMMARY OF THE INVENTION

It is an object of the present invention to provide a magnetic recording means for reading and recording information on a photographic film in a photographic still camera without the use of a support for the film opposite from the recording head.

In accordance with the invention, magnetic recording on a photographic film in a still camera is achieved in a simple reliable manner by taking advantage of the residual stiffness imprinted to the film by the camera and/or cartridge parts. In the disclosed embodiment advantage is taken of the residual stiffness of the film as it exits the lip opening of a film cartridge and the stiffness imparted to the film by the pressure plate. By positioning a magnetic head in close proximity to the lip opening and providing for limited movement of the head in directions to compensate for disturbances such as variations in film curl, the lateral lengthwise stiffness imparted to the film enables the head to read or write with reliability without the use of a support on the other side of the film. Thus the film itself provides the support or back-up means commonly used in equipment such as movie cameras and in the apparatus disclosed in application Ser. No. 254,903 discussed above.

BRIEF DESCRIPTION OF THE DRAWINGS

Other advantages of the invention will become apparent from the following description taken in connection with the accompanying drawings wherein.

DETAILED DESCRIPTION OF THE INVENTION

Figure 1:
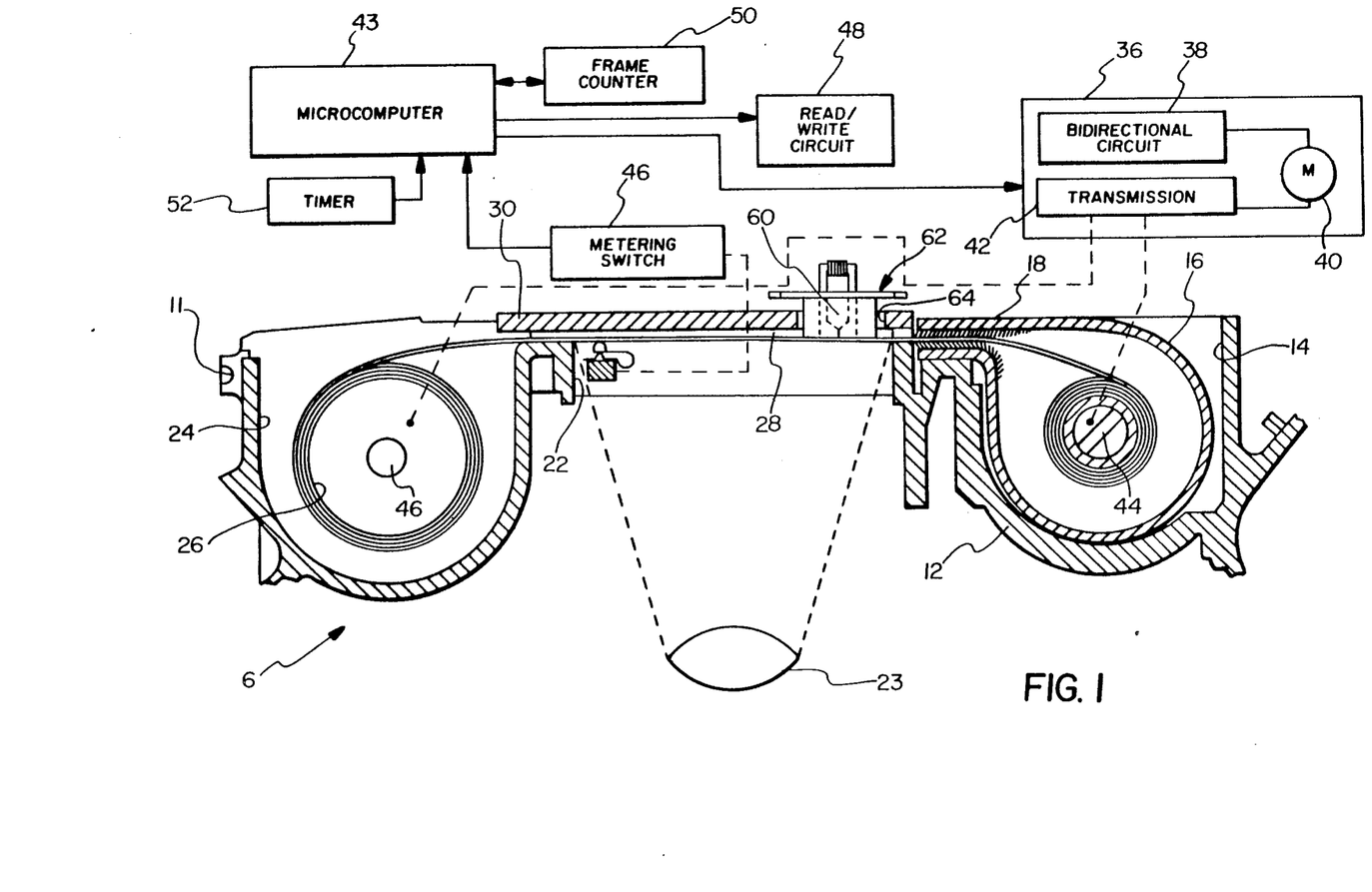
FIG. 1 is a cross section of a portion of a conventional photographic still camera illustrating a magnetic recording apparatus in accordance with the invention.
Figure 2:
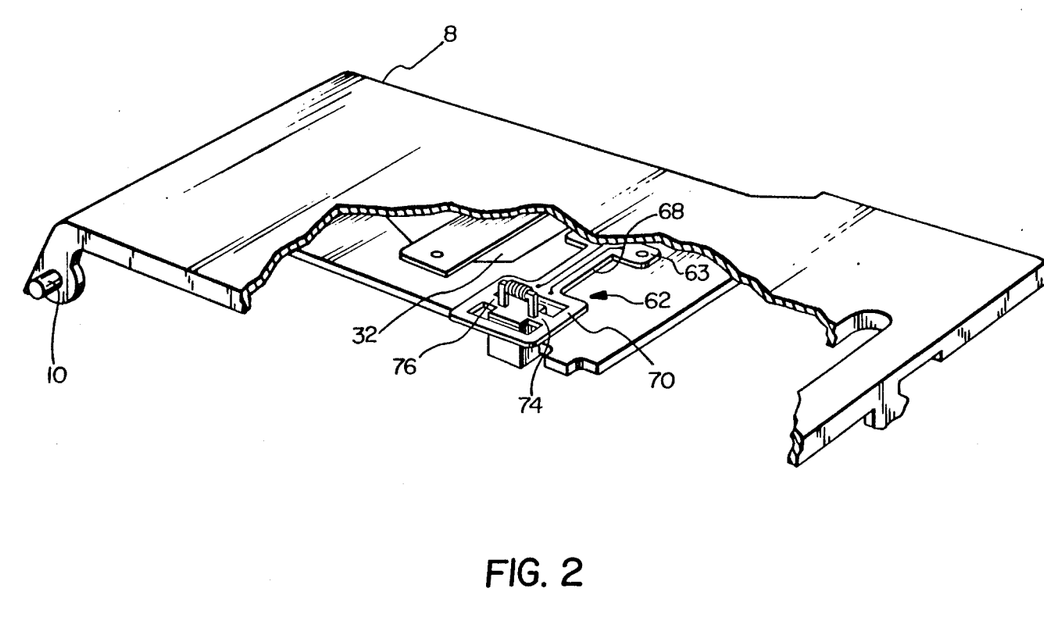
FIG. 2 is a perspective view of the back or door for the camera illustrated in FIG. 1.
Figure 3:
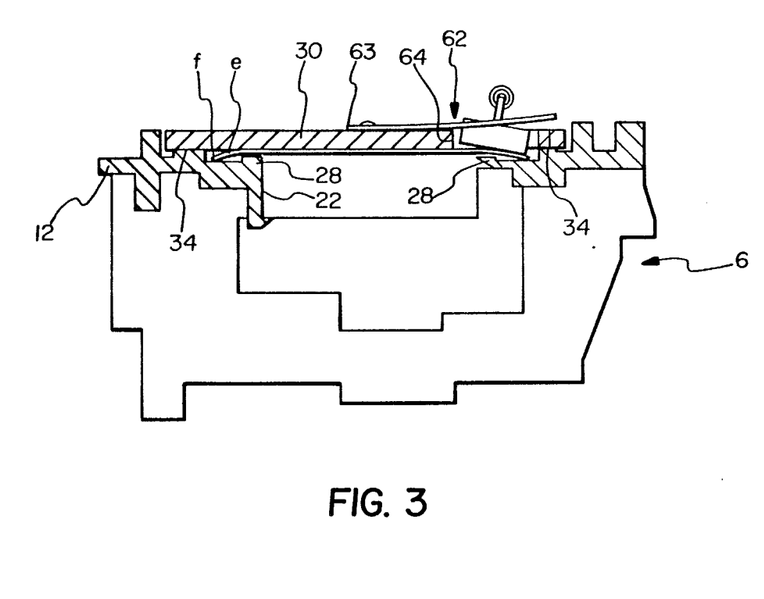
FIG. 3 is a cross section taken perpendicular to the section shown in FIG. 1.

Referring to FIGS. 1, 2 and 3 of the drawings, there is shown a portion of a typical photographic still camera 6 having a back or rear door 8 (FIG. 2) pivotal to an open position by means of a pair of pins 10 one of which is shown in FIG. 2. The pins 10 are received in holes 11 in frame 12. Since such cameras are well known in the art, features not necessary for an understanding of the present invention have been omitted or shown in block diagram to simplify the disclosure. Also, the invention will be described with reference to a single magnetic head. However, it is to be understood that a camera can be provided with a plurality of heads for multi-track recording.

The camera 6 comprises a frame or housing 12 having a chamber 14 at one end thereof for receiving a film cartridge 16. The cartridge 16 which is shown more clearly in FIGS. 4 and 5, preferably takes the form of the film cartridge disclosed in the referenced copending application U.S. Ser. No. 221,955 having a lip 18 from which a film 20 is removed for exposure The film 20 is provided with a virtually transparent magnetic coating 21 on its non-emulsion side, a single row of perforations along one edge and dedicated longitudinal recording areas along the edges outside the image area. As disclosed in copending application Ser. No. 255,963, filed Oct. 7, 1988 in the name of Robert P. Cloutier et al. and entitled FILM INFORMATION EXCHANGE SYSTEM USING DEDICATED MAGNETIC TRACKS ON FILM, the recording areas would be dedicated areas for recording information in the camera, the image area being dedicated to the recording of photofinishing information.

It will be apparent, however, that the recording apparatus disclosed herein is equally applicable to magnetic coatings or stripes on conventional 35 mm film, and that the camera apparatus disclosed herein can alternatively be a conventional 35 mm camera such as the commercially available KODAK K-14 Medalist VR 35 camera.

Figure 4:
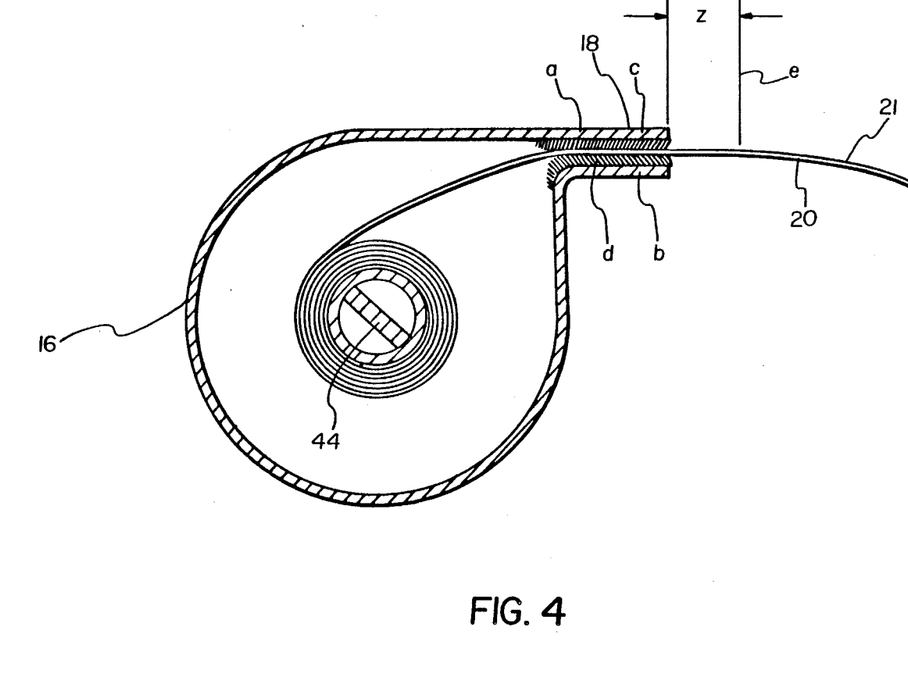
FIG. 4 is an enlarged cross section of a conventional 35 mm film cartridge.

As shown in FIG. 4, the lip 18 comprises upper and lower spaced flanges (a) and (b) which serve to clamp upper and lower pieces of plush material (c) and (d) to opposite sides of the film to essentially provide a cantilever support to the film which results in diminishing residual stiffness of the film from the lip to the end (e) of zone Z shown in FIG. 4 as discussed in more detail below.

As is well known in the art, the surfaces of cartridge 16 and lip 18 engage complimental surfaces of the chamber 14 and the camera back whereby when the camera back is closed, the cartridge is fixedly held in the orientation shown in FIG. 1. Since such camera and cartridge interface features are well known in the art, further description is deemed unnecessary.

From the lip 18, the film 20 is transported across a rectangular exposure opening 22 aligned with a taking lens 23 to a film take-up chamber 24 where it is wound on a take-up spool 26 Mechanisms for accomplishing such film transport are well known in the art. Typically, they operate to advance the film frame by frame from the cartridge to the take-up spool, or if the camera exposes during rewind, frame by frame from the take-up spool to the cartridge.

A pair of film rails 28 are formed on opposite sides of the rectangular exposure opening 22 to engage the longitudinal edges of the film. The film 20 is urged toward the rails 28 by a platen 30 mounted on a leaf spring 32 on the camera back 8. The platen 30 comprises a flat rectangular plate having planar dimensions complimental to the rectangular exposure opening 22 whereby upon closure of the back, platen 30 will engage platen support surfaces 34, engage the film 20 and urge it with slight pressure toward rails 28 under the influence of spring 32 as shown more clearly in FIG. 3. The platen 30 will tend to remove longitudinal curl resulting from film core set in the cartridge 16 and some of the transverse curl across the film. However, since the film is unsupported transversely on its emulsion side, some transverse curl still exists during film exposure as indicated in FIG. 3 at areas (e) but not enough to noticeably degrade the image.

In a typical still camera, the spacing between the platen 20 and the rails 28 is in the range of 0.25–0.45 mm as a result of manufacturing tolerances. The photographic film used in such a camera is typically 0.15 mm thick. Accordingly, as shown in FIG. 3, the film may not actually engage the rails. Due to the transverse film curl, the extreme edges of the film may actually engage the camera surfaces (f) on the other side of the rails with the curl bias causing most of the width of the film to engage the platen. Because of this result, the camera lens is typically focused on a film plane next to the platen.

FIG. 1 also depicts in a block diagram some of the more basic central features of cameras of the type described. Typically, a motorized film transport means 36 comprising a conventional bi-directional circuit 38 for reversing a drive motor 40, a drive transmission 42 and drive hubs 44 and 46 which engage the core of film cartridge 16 and the take-up spool 26 respectively, is provided for rotating the spool core and the take-up spool either in the unwinding or winding directions under the control of a micro computer 43.

Other elements of the camera include a conventional metering switch 46, a read/write circuit 48, a shutter release mechanism, a conventional digital frame counter 50 and a conventional timer 52. These components are all controlled from the micro computer 43 in a manner well known in the art and since they form no part of the present invention, further description is deemed unnecessary As mentioned above, magnetic recording in photographic still cameras involves unique problems. Film advance occurs in a short period of time with a limited amount of motion and does not allow the steady conditions normally associated with magnetic recording to be achieved In view of these problems, the read/write circuit 48 preferably utilizes the encoding and decoding techniques disclosed in the referenced commonly assigned copending applications U.S. Ser. Nos. 206,407, 206,408 and 206,553, and the code format preferably takes the form of that disclosed in the referenced copending application Ser. No. 206,646.

In accordance with the invention, a conventional magnetic read/write head 60 connected to the read/write circuit 48 is mounted on an elongated flexure 62 having an end flange 63 attached at one end to the platen 30 by, for example, screws or cement. The head 60 and head support assembly extends through an opening 64 in platen 30 and is positioned so that when the camera back is closed as shown in FIG. 1, the head will engage the transparent magnetic coating of the film in the region adjacent the lip 18 of cartridge 16. The position of head 60 in the flexure 62 is adjusted so that when the camera back is closed the head will maintain slight contact (i.e. within 10 micro-inches) with the magnetic coating of film 20 with a bias force in the range of 14–56 grams.

Figures 5, 6, 7:
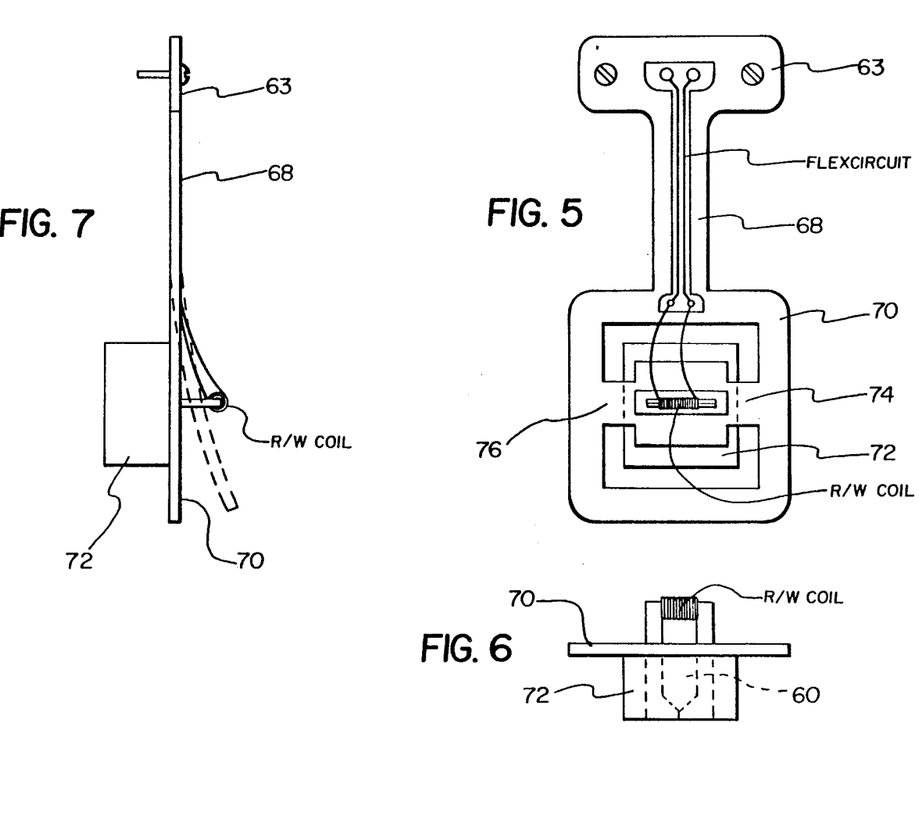
FIG. 5 is an enlarged top view of the flexure and head assembly shown in FIGS. 1 and 2.
FIG. 6 is an end view of the assembly shown in FIG. 5.
FIG. 7 is a side view of the assembly shown in FIG. 6.

Referring specifically to FIG. 5, the flexure comprises a flexure arm 68 extending from the flange 63 along an axis perpendicular to the longitudinal film axis. The arm 68 carries at its movable end an integral rectangular flexure frame 70 which is connected to a head support 72 by two inwardly extending transverse flexures 74 and 76.

The arm 68 functions as a torsion system to permit tilting or roll of the assembly comprising head 60 and support 72 transversely of the longitudinal film axis to accommodate variations in transverse film curl described above. The flexures 74 and 76 form a second independent torsion system to permit tilting or pitching of the head 60 in the longitudinal direction of the film to accommodate any disturbances in the longitudinal direction. The arm 68 will allow displacement of the head 60 in a vertical direction substantially perpendicular to the film as shown in FIG. 7. The flexure 62 thus allows freedom of movement of the head 60 and its support 72 on three axis (roll, pitch and elevation). The pitch axis is the axis of flexure arms 74 and 76 and the roll axis is the longitudinal axis of flexure arms 68 and 70. The elevation axis is the axis of head 60.

The flexure 62 is somewhat similar in configuration to the twin arm flexures employed in floppy disc recorders. However, to accommodate the more extreme disturbances encountered with photographic film, the single flexure arm 68 is provided with more flexibility for permitting greater accommodation to roll and elevational movement. Flexures 74 and 76 are also more flexible to retain the head in contact with the film during variations in longitudinal curl. Thus, the flexure has novel characteristics which enable it to accommodate the disturbances in a photographic film environment.

To calibrate the system, the vertical position or elevation of the head 60 is initially adjusted in support 72 to establish a high head contact force on the film. This force is then reduced through adjustment of the head elevation until it has insignificant effect on the film flatness and still provide good magnetic coupling. The other two degrees of freedom (pitch and roll) are relied on to maintain contact of the head with the film during film transport.

Because of the stiffness imparted to the film by the cartridge lip 18, the film will have diminishing residual stiffness to the end of zone Z shown on FIG. 4 which is the region where it is engaged by head 60. This, coupled with the straightness of the film accomplished by means of platen 30 and rails 28 eliminates the need for special supports on the side of the film opposite from the head. The flexural mounting of the head 60 will accommodate any remaining film curl variations and other disturbances to achieve reliable recording.

The disclosed embodiment of the invention achieves magnetic recording on conventional photographic film in a still camera by uniquely utilizing existing characteristics of the film and camera parts in combination with a flexure that accommodates tolerable film variations. Since the only additional mechanical parts that need be added to a conventional camera to achieve magnetic recording comprise a magnetic head and flexure, the system possesses significant advantages from a cost standpoint. Also, by mounting the head on the platen and avoiding use of a support on the other side of the film from the head, the size of the camera is not increased. Thus the invention has significant advantages.

Another significant advantage of the flexural mounting of the head is that the intimate contact necessary for proper magnetic coupling can be achieved with a very slight normal force applied to the film by the head. This allows the head to be physically located near the photographic image area without disturbing the position of the film or affecting image quality.

Another significant advantage of the flexural mounting of the recording head is that the inherent compliance permits the magnetic head to adjust to small transient disturbances and thus maintain the required head to film contact.

Still another significant advantage of the flexural head mounting is that it presents very low resistance to the film threading operation wherein the leading edge of the film must be pushed across the surface of the head. Because of the low contact force required (50 grams or less), the leading edge of the film acting on the curved surfaces of the head can readily lift the head so that it permits no obstruction in the film path.

While the invention has been shown and described with reference to a preferred embodiment thereof, it will be apparent that various changes may be made without departing from the scope of the invention as defined by the appended claims.

We claim:

1. A photographic still camera including a camera body for receiving a film cartridge and means for exposing film contained in the film cartridge, the film having a magnetic recording area and the cartridge having a lip for exiting film from the cartridge and orienting the cartridge within the camera body, said camera comprising:
   a magnetic recording head positioned in said body adjacent the lip of the cartridge for recording information on the film; and
   flexure means for movably supporting and constraining said head to motion in predetermined directions.

2. A photographic still camera as claimed in claim 1 wherein said flexure means supports said head for movement in a direction normal to the film plane, roll movement in a direction transverse to the film plane and pitch movement in a direction longitudinal to the film plane.

3. A photographic still camera as claimed in claim 1 further including:
   an exposure opening in the camera body;
   parallel film rails on opposite sides of said opening; and
   a platen for urging the film toward said rails;
   said flexure means supporting said head on said platen for movement in predetermined directions relative to said film.

4. A photographic still camera as claimed in claim 3 further including:
   a rear door having open and closed positions on said body; and
   spring means resiliently supporting said platen on said door, said spring means being adapted to urge said platen into engagement with said film when said door is closed.

5. A photographic still camera as claimed in claim 4 wherein said flexure means permits said head to move in three directions relative to the film to compensate for disturbances in the film surface.

6. A photographic still camera as claimed in claim 5 wherein said flexure means comprises an elongated arm fixed at one end to said platen, a flexible frame at the other end of said arm, and a pair of flexures extending inwardly of said frame, said head being supported on said inwardly extending flexures, said arm permitting roll and elevational movement of said head relative to the longitudinal axis of the film and said inwardly extending flexures permitting pitching movement of said head relative to the longitudinal axis of the film.

7. A photographic still camera for use with film having a magnetic recording area, said camera comprising:
   means defining a film path having a zone where the film has residual stiffness produced by a mechanical effect;
   a magnetic head engaging the magnetic recording area of the film in said zone; and
   flexure means for movably supporting said head and constraining said head to motion in predetermined directions.

* * * * *

UNITED STATES PATENT AND TRADEMARK OFFICE
CERTIFICATE OF CORRECTION

PATENT NO. : 4,947,196

DATED : August 7, 1990

INVENTOR(S) : Michael L. Wash et al.

It is certified that error appears in the above-identified patent and that said Letters Patent is hereby corrected as shown below:

Column 4, Line 12    "255,963" should read --255,693--

Signed and Sealed this

Twenty-ninth Day of October, 1991

Attest:

HARRY F. MANBECK, JR.

*Attesting Officer*    *Commissioner of Patents and Trademarks*